United States Patent [19]
Kammiller

[11] Patent Number: 5,610,508
[45] Date of Patent: Mar. 11, 1997

[54] CIRCUITRY TO MAINTAIN PROPER CURRENT TRANSFORMER OPERATION

[75] Inventor: Neil A. Kammiller, Lorain, Ohio

[73] Assignee: Reltec Corporation, Lorain, Ohio

[21] Appl. No.: 260,767

[22] Filed: Jun. 16, 1994

[51] Int. Cl.$^6$ ............................. H01F 38/28; H02M 3/24
[52] U.S. Cl. ............................................. 323/358; 363/97
[58] Field of Search ............................. 323/358; 363/17, 363/97

[56] References Cited

U.S. PATENT DOCUMENTS

| | | |
|---|---|---|
| 4,605,865 | 8/1986 | Yuzurihara ............................. 307/270 |
| 4,659,942 | 4/1987 | Volp . |
| 4,922,404 | 5/1990 | Ludwig et al. . |
| 4,958,268 | 9/1990 | Negagata et al. . |
| 5,057,698 | 10/1991 | Widener et al. . |
| 5,068,776 | 11/1991 | Polivka . |
| 5,157,592 | 10/1992 | Walters . |
| 5,418,703 | 5/1995 | Hitchcock et al. ........................ 363/17 |

Primary Examiner—Stuart N. Hecker
Attorney, Agent, or Firm—Fay, Sharpe, Beall, Fagan, Minnich & McKee

[57] ABSTRACT

A circuit to maintain proper current transformer operation in a resonant transition converter circuit or any circuit having a wide range of reverse current present in a current transformer primary at the beginning of a power pulse. The circuit includes an active clamp which is applied to an extra secondary on the current transformer for the duration of a "on" time of a switch associated with a particular current transformer. A diode of the active clamp is polarized to accept current in the secondary when primary current is reversed or negative flow. Thereby only small amounts of voltage, and thus volt-seconds will be developed on the transformer during reverse primary current, in turn keeping the current transformer out of reverse saturation. A current generator provides a bias current during the on time of the switch associated with the particular current transformer and switches a bias current into the main current transformer secondary during the power pulse to offset the negative primary current which occurs at the beginning of a power pulse.

16 Claims, 7 Drawing Sheets

CIRCUITRY TO MAINTAIN PROPER CURRENT TRANSFORMER OPERATION

BACKGROUND OF THE INVENTION

The present invention relates to circuitry used to assist in maintaining proper operation of a current transformer, and more particularly to circuitry to maintain proper current transformer operation in a resonant transition converter circuit or any other circuit having a wide range of reverse current present in a current transformer primary at the beginning of a power pulse.

The present invention will be described in connection with a phase shifted full-bridge resonant transition converter circuit employing zero-voltage switching in the power switching devices.

FIG. 1 illustrates a phase shifted full-bridge converter with FET transistor switches Q1, Q2, Q3 and Q4 operating at a fixed frequency. In order to lower the power dissipation in this circuit zero-voltage switching techniques are implemented where a switch begins conduction with a near zero-voltage existing across the switch.

The "on" time of the diagonally conducting switches (i.e. Q1 and Q4 or Q2 and Q3) is not varied as in a PWM bridge type circuit, rather the switches in a first leg (Q1 and Q2) and a second leg (Q3 and Q4) are made to conduct at a duty cycle approaching 50%. The waveforms for such switching are shown in FIG. 2. The phase shift between the operation of the devices of each of the legs determines when diagonal switches are conducting at the same time and, therefore, supplying power to a load. By varying the phase shift, the resulting output voltage can be pulse width modulated. In the converter, transformer primary current flowing at turn-off of one transistor charges the parasitic capacitance of that transistor while reducing the charge on the parasitic capacitances of the other transistor in the same leg, thereby reducing the voltage across the transistor, which is also the next transistor to be turned on. Obtaining zero-voltage switching requires that the turn-on of the transistor in the same leg with a transistor that was just turned off must be delayed until the voltage across the transistor has been reduced to near zero.

At the moment of turn-off of each transistor switch Q1–Q4, there needs to be present in that switch a lagging current of sufficient amplitude and duration to cause the voltage on that switch to rise to the amplitude of the supply in a totally passive fashion. At heavier loads, this current will be present in the series inductance of the power transformer. At lighter loads, the current may be obtained from energy stored in the shunt inductance of the power transformer.

However, as the load approaches no-load and the phase angle approaches 0°, the volt-seconds applied to the power transformer primary approaches zero, and the energy stored in the power transformer primary which is available as a lagging current for resonant transition also approaches zero. In such a situation resonant transition can fail. As the load approaches a no-load situation the currents are basically comprised of inductive currents. Since the-current in the power transformer is inductive, the current will ramp up, level off and then it will ramp down in the other direction and then again level off.

A key point with regard to the present invention is that, especially at lighter loads, the currents in the FET switches will have both forward (positive) current and reverse (negative) current. In most circuits current flows only in one direction, for example into the drain of a transistor. In this circuit when the switches are activated by a power pulse reverse current will flow and this reverse current may last as long as half of the power pulse.

With attention directed more particularly to the present invention, converters, supplies and many other devices employ current transformers to assist in control operations. Among other applications current transformers are used to indicate transitions, and changes, and measure values including peak values, within a circuit. Benefits of using current transformers for control and limiting applications include their ability to provide good signal-to-noise ratio, isolation between the control circuit and the line being monitored, good common-mode rejection, and they do not introduce excessive power loss in high-current applications.

In general, for current transformers, the larger the inductance, the smaller the magnetizing current and the more accurate the measurement. The magnetizing current component increases during the pulse duration and will be subtracted from the quantity to be measured. Consequently, at the end of a conduction pulse, the magnetizing current should be small compared with the measured quantity. For current limiting applications, a magnetizing current of 10% is a typical design limit. This magnetization effect is most easily shown in a uni-directional current transformer.

FIG. 3 shows a typical uni-directional current transformer and secondary circuit. The current transformer primary $T_{cp}$ has a single turn. The primary turn is thus in series with a line to be monitored.

The current transformer secondary $T_{sc}$ has a larger number of turns, which are terminated in resistor R via diode D1. The intention is that a true voltage analogue of the primary forward current pulse $I_p$ be developed across R. D1 blocks a reverse recovery voltage. However, it will be seen from FIGS. 4a and 4b that the secondary waveform is distorted as a result of the magnetizing current component.

FIG. 4a illustrates the applied all positive primary current pulse $I_p$. FIG. 4b depicts the corresponding secondary current analogue pulse developed across R2. The effect of two values of secondary magnetizing current, a small value $I_{mag1}$ and a large value $I_{mag2}$, details how the magnetizing current is effectively subtracted from the ideal transformed current analogue $I_{s(ideal)}$. From this diagram it is clear that if the peak value of the current at the end of the conduction pulse, $I_p$, is to be useful for current-limiting purposes, then the secondary shunt inductance of the current transformer must be large enough to ensure that at least a positive slope remains on the net secondary waveform. This means that a sizeable secondary inductance is needed, and so a larger number of secondary turns, a larger core, and high-permeability core material are desirable.

A second major factor that influences the current transformer magnetizing current is the magnitude of the secondary voltage. This voltage is the sum of a selected signal voltage $V_o$ and the rectifier diode D1 forward voltage drop. Larger secondary voltages are advantageous (consistent with a good signal-to-noise ratio), however, large values of $V_o$ will result in large magnetizing currents.

If a smaller core is chosen for the current transformer, then to get the required inductance, a larger number of secondary turns will be required. If the number of secondary terms is too large, then there will be significant interwinding capacitance, and the high frequency response (response to narrow current pulses) will be degraded.

FIG. 5 illustrates a basic arrangement of a uni-directional type current monitoring transformer in a single-ended forward converter.

In this example when the primary power transistor $Q_1$ is on, the forward current in the current transformer primary $T_{cp}$ takes the start of all windings positive, and the secondary diode D1 conducts. The current in R2 will be a transform of the primary current and an analogue voltage of the primary current will be developed across R2.

When Q1 turns off at the end of the forward current pulse, rapid reset of the current transformer core occurs as D1 acts as a block and the secondary flyback load resistance R1 is high. As a result, the flyback voltage is large, and this gives a rapid core reset between forward pulses. That is, the flux density $\beta$ returns to a residual value $\beta_r$ during the off time ready for the next forward pulse.

A $\beta H$ curve as shown in FIG. 6 is used to depict the amount of flux density $\beta$ which results from increasing the amount of a field intensity H. $\beta_r$ represents the residual flux density of a system such as that presently under consideration when the transformer has been reset. $\beta_w$, which is the working value of flux density, represents when the transformer has stored energy. $\beta_s$ and $-\beta_s$ represent when the transformer has become saturated.

As shown in FIG. 7 current transformers $C_{T1}$, $C_{T2}$ may be placed in the drains of FET switches Q1 and Q2. Signals $S_1$, $S_2$ produced from each the current transformers $C_{T1}$, $C_{T2}$ are combined and are used as an input signal $S_{12}$ for current controller $C_c$. Input signal $S_{12}$ is used to determine the amount of current which needs to be delivered to the circuit (i.e. $Q_1$–$Q_4$) in the form of a power pulse.

Problems arise in the converter of FIG. 7 when the resonant transition circuit is operating at or towards a no-load situation. As previously mentioned, reverse currents will exist in the FET transistor switches implemented in this circuit and at light loads the reverse currents become quite substantial.

During normal operation, of the circuit shown in FIG. 7 the switches are on for 50% of the time. This again is different from straight pulse width modulated, PWM, circuitry where the "on" time of the switches can be varied from 50% to 0%. During normal operation when the switch in question is "on" energy is stored in the inductor or the core of the transformer. Therefore, during normal operation when the switch is "on" energy is being stored in the core. When the "on" half cycle is over, and the FET current is gone, the stored energy will come out of the core to produce a reverse voltage on the transformer allowing the transformer to be reset.

At light loads the current at the start of the power pulse will be reverse or negative current, and it may be a heavy reverse or negative current that stays for half the power pulse. In such a situation, the inventor has noticed that this heavy reverse or negative current will reset the current transformer into a heavy negative saturation $-\beta_s$ and that a large amount of energy is stored during this negative saturation. When the FET current reaches zero during the power pulse in a positive going transition, the energy that was stored during the reverse or negative current portion (the energy that is stored during the negative saturation of the current transformer) comes out and begins building a floating "pedestal" under the current pulse signal. This causes unstable responses from the current transformers which in turn provides unpredictable and unstable operation of the converter circuit.

The present invention provides a new and improved circuit to maintain proper current transformer operation in a resonant transition converter circuit or any circuit having a wide range of reverse current present in a current transformer primary at the beginning of a power pulse.

SUMMARY OF THE INVENTION

A current transformer assembly is provided for use in a resonant transition full-bridge converter circuit. The converter circuit operates in a fixed frequency zero-voltage switching mode. A plurality of FETs are used as switching elements and are activated upon receipt of a pulse to an appropriately associated drive terminal. The current transformer assembly includes a current transformer having a primary current transformer winding circuit inserted into a drain of a first one of the FET switching elements to carry a primary current. A secondary current transformer winding circuit is magnetically linked to the primary current transformer winding circuit to generate a secondary current when the primary current is positive. An active clamp which is activated simultaneously with and for a same time period as the power pulse. The active clamp is magnetically linked to the primary current transformer winding circuit to generate a clamp current when the primary current is negative. A bias current generator is inserted into the secondary current transformer winding circuit and is activated simultaneously with and for the same time period as the power pulse at the associated drive terminal.

In a more limited aspect of the present invention, the active clamp includes a clamp winding which is magnetically linked to the primary current transformer winding circuit. The active clamp further includes a clamp switch connected to the drive terminal such that receipt of the power pulse by the drive terminal simultaneously activates the clamp switch. A diode is connected to the clamp winding and the clamp switch in such a manner as to allow clamp current to flow when the primary current in the current transformer is negative.

In another aspect of the present invention, the bias current generator includes a first bias current generator switch connected to a supply voltage of the converter circuit, and to the drive terminal such that receipt of the power pulse by the drive terminal simultaneously activates the bias current generator switch. A second bias current generator switch is connected to the first bias current generator switch, to a first side of the secondary current transformer winding circuit and to a resistance which is connected to a second side of the secondary current transformer winding circuit. This arrangement generates a bias current in the secondary current transformer winding circuit to counteract negative current in the current transformer primary.

A principle advantage of the subject invention resides in improved operation of circuits having a wide range of reverse current present in a current transformer primary at the beginning of a power pulse.

Yet another advantage is allowing a resonant transition converter circuit to operate reliably in no-load, zero phase angle situations.

Still another advantage is realized in the use of an active clamp which does not allow a current transformer to enter negative saturation.

Still yet another advantage is found in the generation of the bias current to allow an otherwise negative current power pulse to be shifted up such that at the beginning of the pulse current it is at or near zero.

Still other advantages and benefits of the invention will become apparent to those skilled in the art upon a reading and understanding of the following detailed description.

BRIEF DESCRIPTION OF THE DRAWINGS

The present invention may take form in various parts and arrangements of parts or in various steps and arrangements of steps. The drawings are only for purposes of illustrating a preferred embodiment and are not to be construed as limiting the invention.

FIGS. 9b and 9c set forth signals associated with FIG. 9a;

FIGS. 10b–10c depict waveforms associated with the current transformer of FIG. 10a;

DETAILED DESCRIPTION OF THE PREFERRED EMBODIMENT

Figure 8:
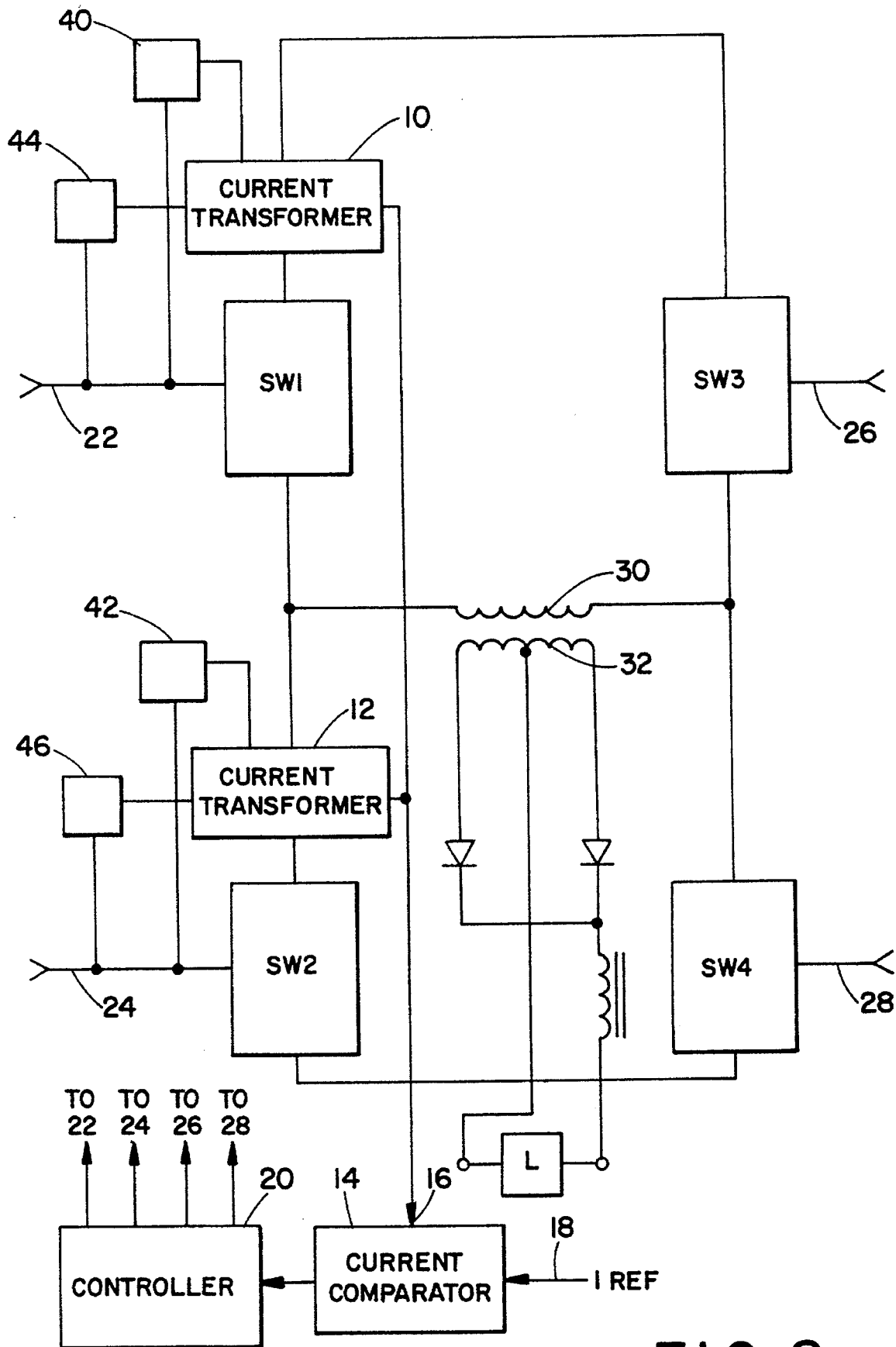
FIG. 8 provides a schematic illustration of a circuit according to the present invention.

FIG. 8 sets forth a circuit according to the present invention which maintains proper current transformer operation in a resonant transition converter circuit or any circuit having a wide range of reverse current present in a current transformer primary at the beginning of a power pulse. The purpose of the circuit is to prevent excessive reset of the current transformer which manifests itself as false forward or "set" signals, especially at lighter loads where reverse primary current in the current transformer is high.

In some circuits the amount of reverse current can be equal to the forward current. The circuit under consideration is used with a resonant transition power circuit. In this topology a reverse current is seen by the current transformer primary. It is largest at "no-load" and is the lagging power transformer primary current which has just previously caused a resonant transition of a drain voltage and is now flowing in a FET reverse parallel diode. The false forward signals which it can cause on the secondary of the current transformer take the form of a pedestal (DC level) signal under a normal current pulse signal.

Figure 1:
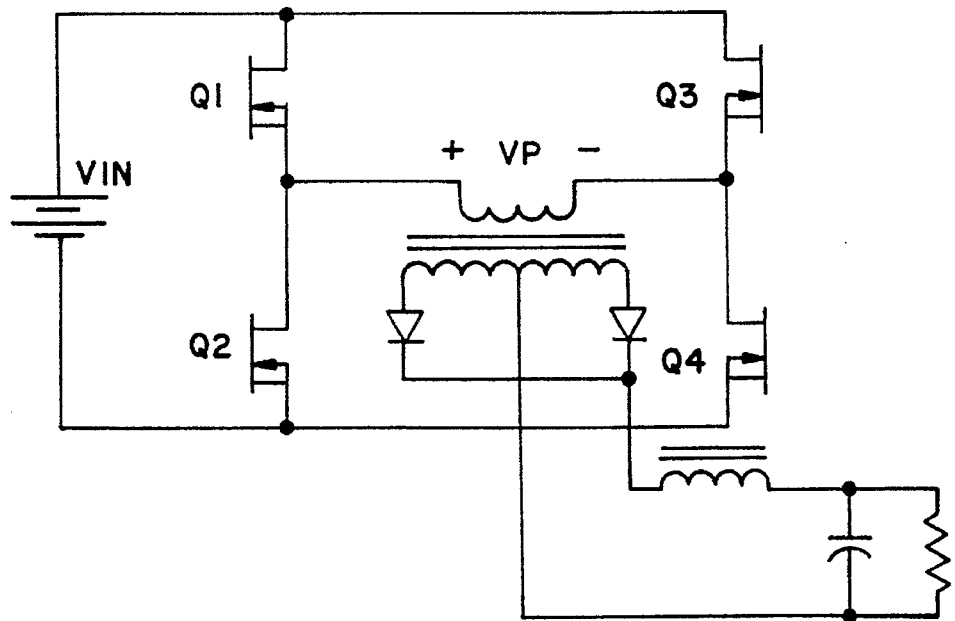
FIG. 1 is a schematic diagram of a prior art phase shifted full-bridge converter.
Figure 2:
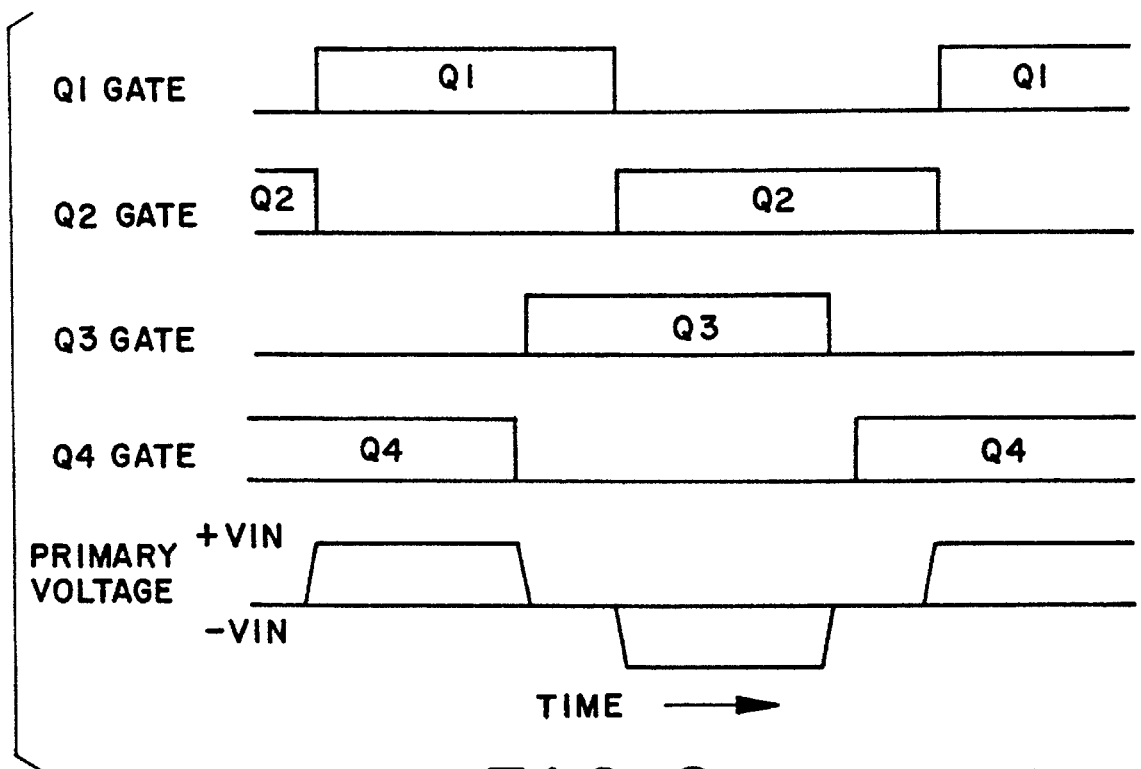
FIG. 2 is a set of waveform diagrams on a common time scale, showing the gate voltages of the four transistors in the full-bridge and the resulting primary voltage, respectively, from the operation of the converter of FIG. 1.
Figure 3:
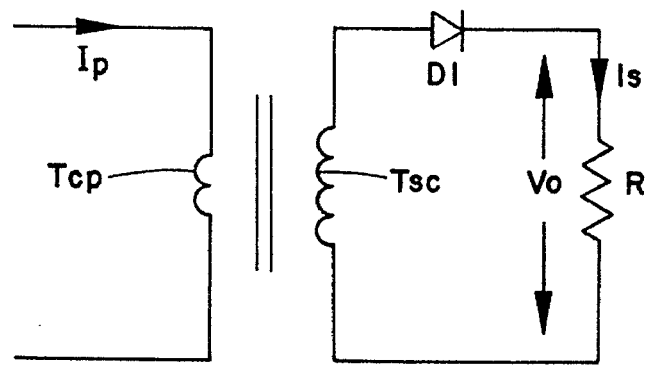
FIG. 3 is a schematic circuit representation of a current transformer and a secondary circuit used for uni-directional current pulse measurement.
Figure 4A:
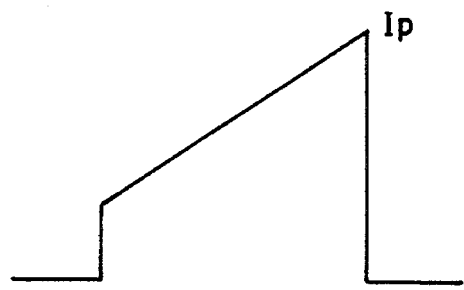
FIGS. 4a–4b show the primary current and developed secondary current waveforms on R2, illustrating the effect of current transformer magnetization current of the current transformer of FIG. 3.
Figure 4B:
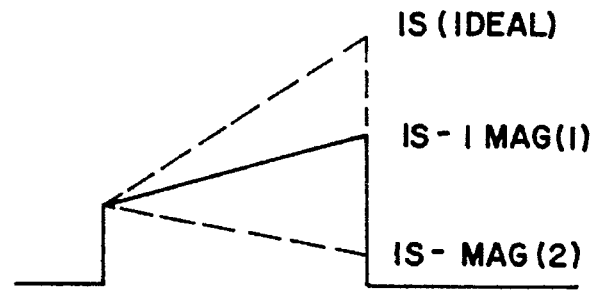
Figure 5:
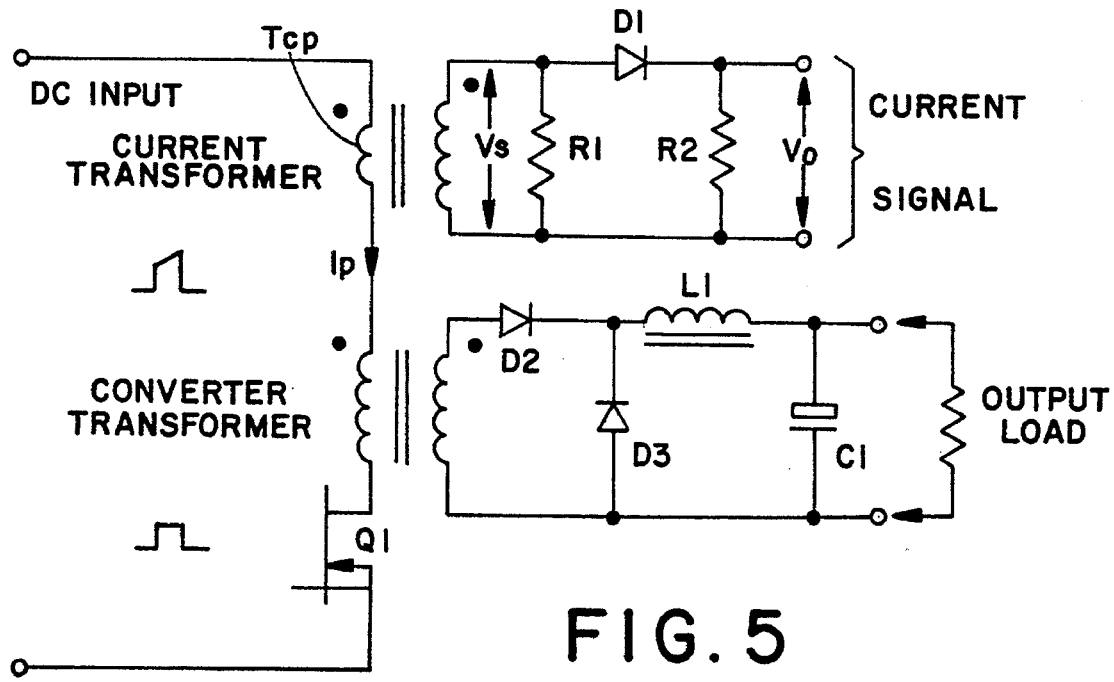
FIG. 5 details a basic arrangement of a unidirectional current transformer in a single ended forward converter.
Figure 6:
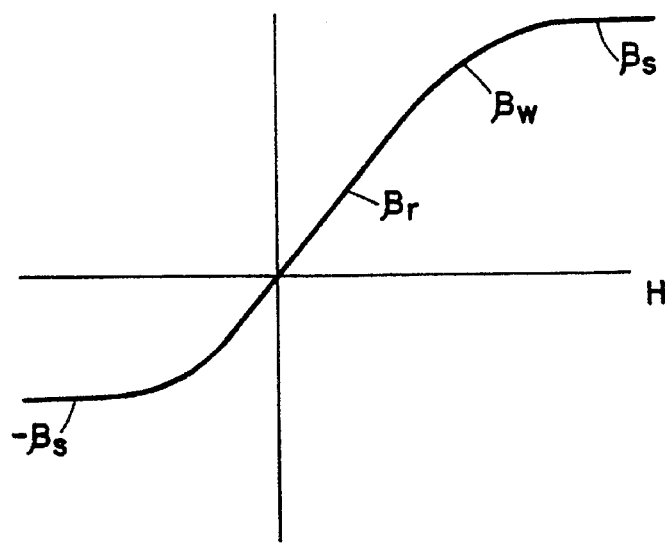
FIG. 6 is a generalized βH curve.
Figure 7:
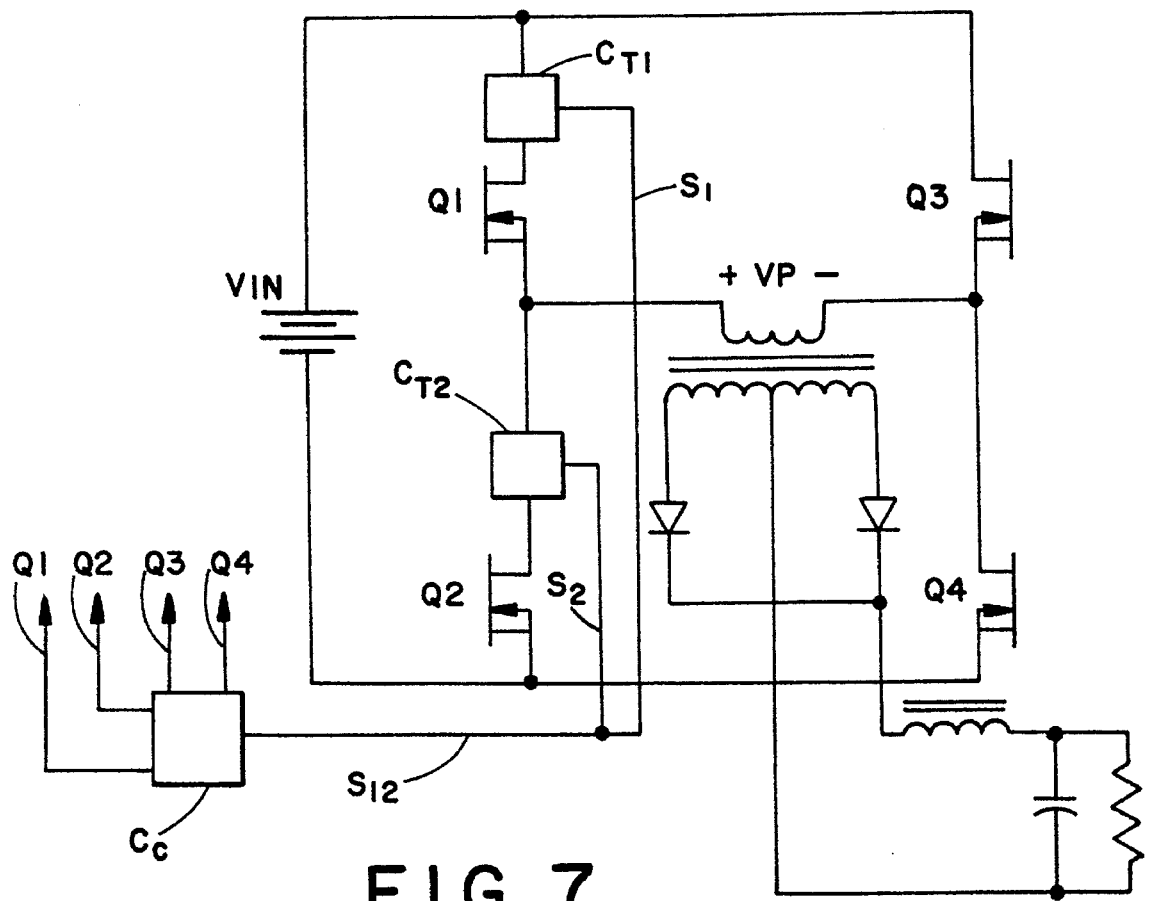
FIG. 7 is a schematic diagram of a prior art phase shifted full-bridge converter including current transformers ($C_{T1}$, $C_{T2}$) located in the drains of switches (Q1, Q2)

More particularly, FIG. 8 illustrates a fullbridge resonant transition converter circuit having a fixed frequency, phase shifted mode of operation. This circuit operates in a manner similar to the circuit set forth in FIG. 7, and includes switches SW1–SW4 (which in this embodiment are implemented by FET transistor arrangements) with current transformers 10 and 12 associated with switches SW1 and SW2 respectively. The outputs of current transformers 10, 12 are combined and input to a current comparator 14 via input 16. An analogue of reference current $I_{ref}$ is input to current comparator 14 via input 18. Using this information a controller 20 controls the timing at which power pulses are provided to switches SW1–SW4 via inputs 22–28. The present circuit switches between diagonal and horizontal conduction. When either pairs of switches SW1 and SW4 or SW2 and SW3 are active diagonal conduction is occurring and power is being transferred from the transformer primary winding 30 to the secondary winding 32 whereby a signal is generated.

In situations from light loads to no-load, significant current will flow in a reverse direction through switches SW1–SW4. When this occurs instability can enter into the system.

In the embodiment of the present invention shown in FIG. 8 current generators 40, 42 and active clamps 44, 46 are added to each of current transformers 10 and 12, respectively. Through operation of these elements it is possible to maintain proper current transformer operation when a reverse current is present in the current transformers primaries at the beginning of power pulses delivered from controller 20.

Figure 9A:
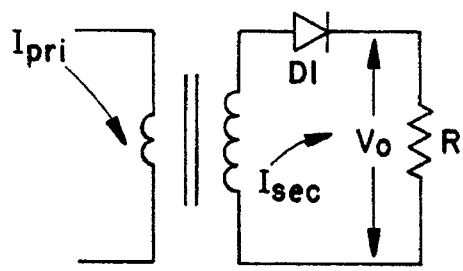
FIG. 9a depicts a simplified illustration of a current transformer operating with normal positive current.
Figure 9B:
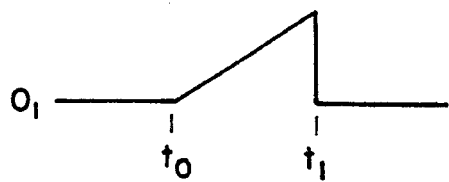
Figure 9C:
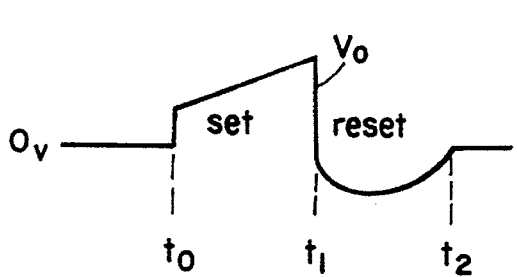
Figure 9D:
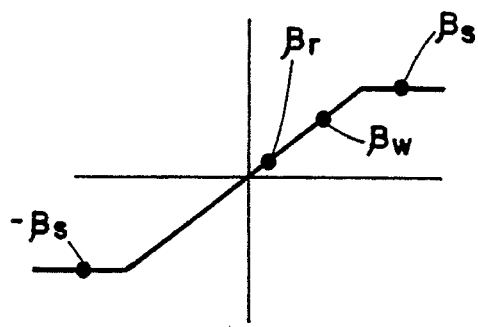
FIG. 9d is a generalized β-H curve associated with the operation of FIGS. 9a–9c.

As illustrated generally in FIG. 9a, when primary current $I_{pri}$ is flowing in the positive (forward) direction, current in the secondary $I_{sec}$ is generated to flow through diode D1 thereby generating a voltage across the load resistor R. Thus during the "set" period of operation, i.e. when a switch (not shown in FIG. 9a) associated with this current transformer is active, primary current $I_{pri}$, as depicted in FIG. 9b, flows through the primary winding. At $t_1$, the switch is deactivated and current returns to zero (0), awaiting the next power pulse. Output voltage $V_o$ across load R, shown in FIG. 9c, is also generated during the "set" portion of operation. As shown in FIG. 9d, during the "set" period flux density β is driven towards a working value $β_w$. When current stops flowing through the primary transformer at $t_1$ a reset operation occurs. This reset operates to drive the transformer from the flux density working value $β_w$ down to a residual flux density $β_r$. Proper reset operation stops the transformer from entering into saturation $-β_s$. Diode D1 is placed in the circuit so that the current transformer may be unloaded during the reset period. During the reset time the volt-seconds generated needs to equal the volts-seconds generated during the set period.

Figure 10A:
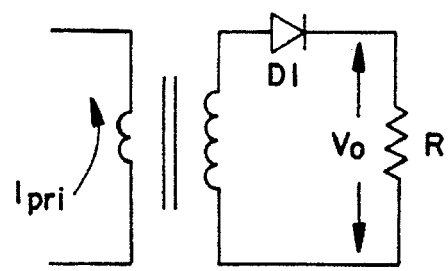
FIG. 10a depicts a simplified schematic of a current transformer with negative current flowing in the primary.

In FIG. 10a a transformer circuit similar to that in FIG. 9a is provided. The major distinction is primary current $I_{pri}$ is flowing in a negative (reverse) direction at the beginning of the power pulse. This reverse current is of special concern when there is an extremely light load or no-load for the resonant transition circuit.

Figure 10B:
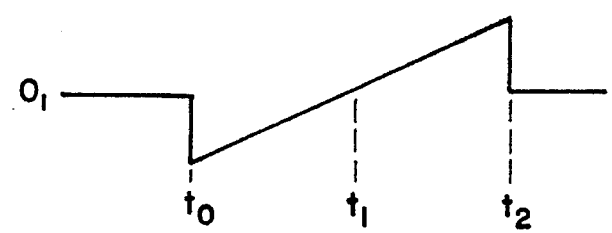
Figure 10C:
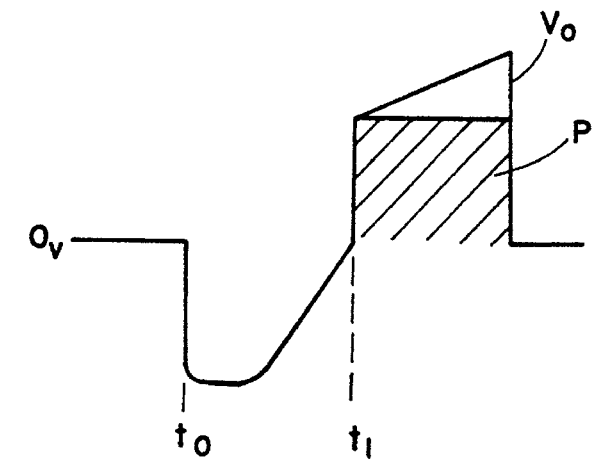
Figure 10D:
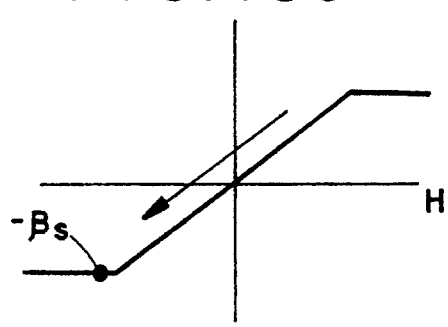
FIG. 10d is a generalized β-H curve associated with the FIGS. 10a–10c.

FIG. 10b shows that the primary current $I_{pri}$ of the current transformer at the start of a power pulse, $t_o$, is negative. This negative current, which may last until half-way through the power pulse (i.e. $t_1$), develops a large negative voltage (see FIG. 10C), causing additional reset of the transformer during time $t_0$ to $t_1$. Due to this, and as shown in FIG. 10d, the transformer is driven to negative saturation $-\beta_s$. From time $t_1$ to time $t_2$ primary current $I_{pri}$ crosses zero and is reversed in its flow to a positive direction. At this time energy stored during the reverse saturation appears to fly out of the current transformer causing a pedestal, P, of output signal voltage.

The current generators 40, 42 and active clamps 44, 46 of the present invention assist in correcting this undesirable situation. Current generators 40, 42 and active clamps 44, 46 are made active when an associated switch is driven with a power pulse. Therefore, whenever one of the associated switches receives a power pulse, current generators 40, 42 and active clamps 44, 46 receive the same power pulse or drive signal. The logic to perform the above actions are provided for in the logic of controller 20 and may be implemented in various known arrangements.

Figure 11A:
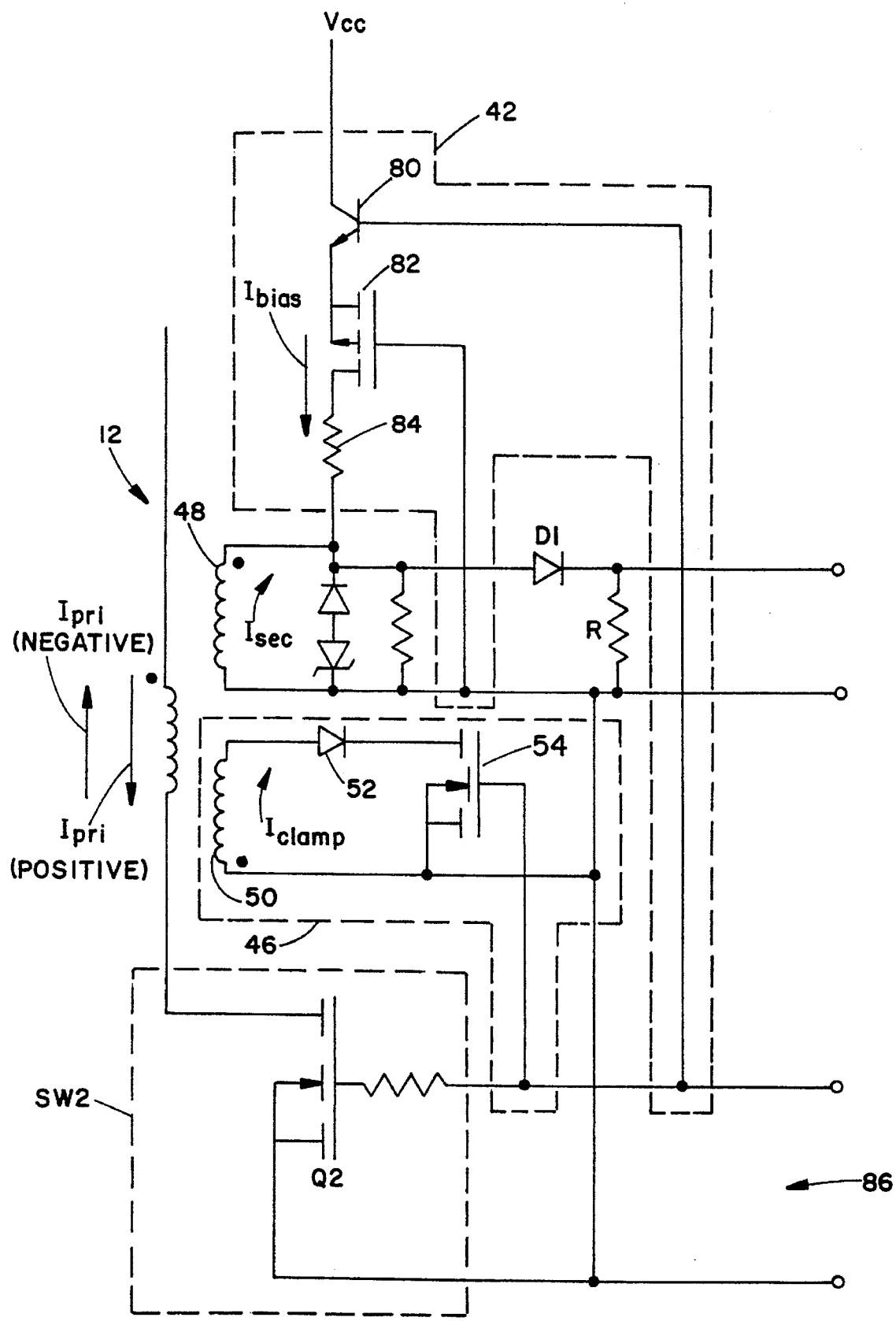
FIG. 11a provides a more detailed schematic according to the circuit of the present invention.

FIG. 11a sets forth current transformer 12, switch SW2, current generator 42 and clamp 46 of FIG. 8 in greater detail. The discussion regarding current generator 42 and active clamp 46 in connection with current transformer 12 and switch SW2 is equally appropriate for the arrangement of switch SW1, current transformer 10, current generator 40 and active clamp 44.

It is also to be appreciated that the current generators 40 and 42 and active clamps 44 and 46 may be used alone or in combination to achieve proper current transformer action during light load and no-load situations.

Discussion will now be directed to the operation of active clamp 46 which includes extra secondary winding 50 (in addition to the main secondary winding 48 of current transformer 12), diode 52 and FET transistor 54. When switch SW2 receives a drive pulse, FET 54 receives the same drive pulse activating the active clamp 46. The active clamp is made active only during the time that the switch SW2 is turned on. As can be seen by the dot notation, when the primary winding of the current transformer 12 is positive and current in the primary $I_{pri}$ is "forward" the secondary current $I_{sec}$ will go through diode D1 to load resistor R2. However, when current in the primary winding is reverse or negative the current $I_{sec}$ cannot go through diode D1.

Figure 11B:
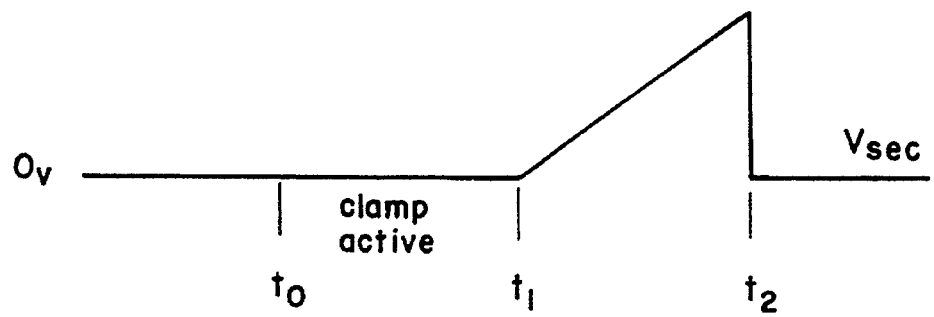
FIG. 11b shows clamped voltage output in an embodiment of the present invention.

Rather, a clamp current $I_{clamp}$ is generated in the active clamp 46. Thus, during the time switch SW2 is on and the current is negative, active clamp 46 acts as a load allowing the current generated due to the reverse or negative primary current $I_{pri}$ to flow through the current transformer 12. In this manner, instead of developing volt-seconds which upon the primary current becoming positive causes instability, these volt-seconds are not developed, and as shown in FIG. 11b the large negative voltage Vo in FIG. 10c is avoided. When the primary current $I_{pri}$ crosses zero and becomes positive excessive volt-seconds have not been stored. The voltage is held down on the current transformer 12 during the negative going time period and when the current turns positive the current will flow through the secondary of the current transformer in normal operation. By this arrangement normal reset action will take place.

In addition to active clamp 46, current generator 42 is provided to generate a predetermined current bias $I_{bias}$ which functions to counteract undesirable effects of the negative primary current in the current transformer at the start of a power pulse. In this arrangement bias current $I_{bias}$, which is a fraction of the primary current $I_{pri}$, is added to the secondary of the current transformer 12.

For instance, if the transformer ratio is 1 to 40, then a current $\frac{1}{40}$ of the primary current is developed as the bias current $I_{bias}$ to counteract the negative or reverse primary current. In the present example, with a turns ratio of 1 to 40, providing a current $\frac{1}{40}$th of the primary current $I_{pri}$ results in a ampere-turns NI of magnetizing force equal to the primary current, NI=40 ×$\frac{1}{40}$, i.e. 1.

Again, bias current $I_{bias}$ generated by current generator 42 may be used alone or in combination with active clamp 46, or the active clamp 46 may be used alone. The current generator 42 switches bias current $I_{bias}$ into the current transformer secondary during the power pulse to offset the negative or reverse primary current which occurs at the beginning of a power pulse which may occur due to a shunt inductance found in power transformers and/or a resonant inductor used in such systems. At "absolute no-load" the negative portion of $I_{pri}$ can last for II/2 radians. By injecting the appropriate bias current the positive current pulse can start at 0 radians.

Figure 12A:
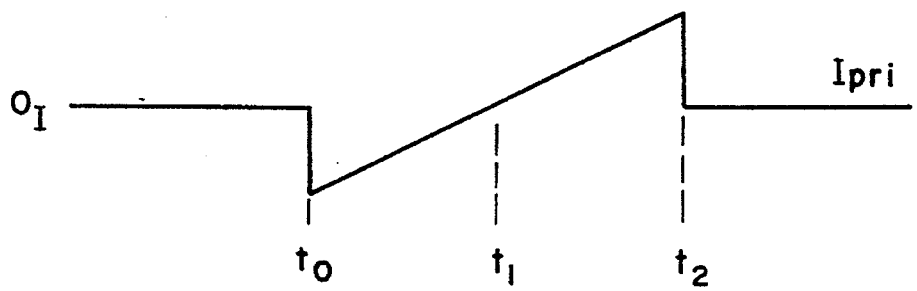
FIGS. 12a–12b are primary and bias currents in an embodiment of the present invention.

FIG. 12a shows the primary current $I_{pri}$ of the current transformer 12. From $t_0$ to $t_1$ the primary current is flowing in a negative or reverse direction causing the current transformer core to be saturated into the negative region. Starting at $t_1$ the current changes to positive going. However, due to the negative or reverse primary current, the output of the current transformer 12 will have a false "pedestal" which causes unstable operation. This is what will be expected without the use of the bias current (and/or the active clamp).

Figure 12B:
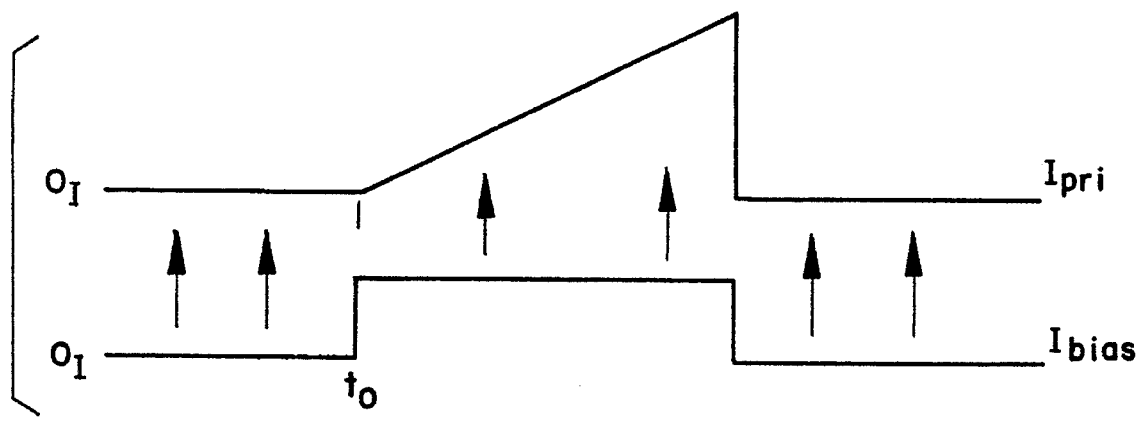

By supplying bias current $I_{bias}$, as seen in FIG. 12b, the primary current $I_{pri}$ is shifted up such that at $t_0$ the current is at zero (0), i.e. no longer negative at the beginning of the power pulse.

As detailed in FIG. 11a, the current generator 42 includes a NPN bipolar transistor 80 which has its collector connected to $V_{cc}$ and its emitter connected to the source of a P-channel FET 82. The drain of FET 82 is connected to a bias resistor 84 with the other end of resistor 84 connected to the secondary of current transformer 12. The base of transistor 80 is connected to drive input 86 of switch SW2. Therefore, whenever switch SW2 receives a power pulse the current generator 42 is activated and is able to provide $I_{bias}$. The current generator 42 addresses a situation where there is an absolute no-load on the converter. The circuit will function with the transformer removed and its base-emitter connections joined; however, the load on the drive input would be increased.

In the present invention current generators 40, 42 and active clamps 44, 46 are made active when the power pulse occurs, and are turned off when the power pulse is over. This allows for a normal reset to occur during the off pulse time periods.

Though the present invention has been discussed in connection with resonant transition circuits, it may also be used in circuits such as inverters and other circuits which encounter high negative initial current.

It is also to be understood that other circuit arrangements may be used to implement current generators and active clamps of the present invention. Including, circuits with n-channel, p-channel FETS, etc. Further, it would be possible to implement the active clamp on the main secondary winding of the current transformer. To configure this arrangement a negative signal and negative source power supply would be required along with a level shifter to change the negative going pulses. It would also be possible to implement the present invention with a depletion mode FET such as a JFET. It would also be possible to drive those circuits when connected to the power switch.

Please also note SW2 can be configured for a floating source connection, such as an upper position in a bridge, from a signal which uses the existing VCC such as that present at the input of a high side driver, for example, the IR 2110 from International Rectifier.

The invention has been described with reference to the preferred embodiment. Obviously, modifications and alterations will occur to others upon reading and understanding the preceding detailed description. It is intended that the invention be construed as including all such alterations and modifications insofar as they come within the scope of the appended claims or the equivalence thereof.

Having thus described the preferred embodiment, I now claim:

1. A current transformer assembly in a resonant transition full bridge converter circuit operating in a fixed frequency zero-voltage switching mode, using a plurality of FETs as switching elements activated upon receipt of a power pulse at an associated drive terminal, the current transformer assembly comprising:

a current transformer having, a primary current transformer winding circuit inserted into a drain or source of a first one of the FET switching elements to carry a primary current, and a secondary current transformer winding circuit magnetically linked to the primary current transformer winding circuit to generate a secondary current when the primary current is positive;

an active clamp activated simultaneously with, and for a same time period as the power pulse at the associated drive terminal, the active clamp magnetically linked to the primary current transformer winding circuit to generate a clamp current when the primary current is negative; and a bias current generator inserted into the secondary winding current transformer winding circuit activated simultaneously with, and for the same time period as the power pulse at the associated drive terminal.

2. The current transformer assembly according to claim 1 wherein the active clamp further includes:

a clamp winding which magnetically links the active clamp to the primary current transformer winding circuit;

a clamp switch connected to the drive terminal such that receipt of the power pulse by the drive terminal simultaneously activates the clamp switch; and a blocking device connected to the clamp winding and the clamp switch to allow clamp current to flow when the current transformer primary current is negative.

3. The current transformer according to claim 2 wherein the clamp winding is magnetically linked to the primary current transformer winding circuit in a polarity opposite to that of the secondary current transformer winding circuit.

4. The current transformer according to claim 2 wherein the blocking device is a diode.

5. The current transformer according to claim 2 wherein the clamp switch is a FET.

6. The current transformer according to claim 5 wherein the FET includes a gate connected to the drive terminal, a drain connected to the blocking device which in turn is connected to one side of the clamp winding, and a source connected to another side of the clamp winding.

7. The current transformer assembly according to claim 1 wherein the bias current generator further comprises:

a first bias current generator switch connected to a supply voltage of the converter circuit, and to the drive terminal such that receipt of the power pulse by the drive terminal simultaneously activates the bias current generator switch; and a second bias current generator switch connected to the first bias current generator switch, to a first side of the secondary current transformer winding circuit, and to a resistance which is connected to a second side of the secondary current transformer winding circuit, to generate a bias current in the secondary current transformer winding circuit.

8. The current transformer assembly according to claim 7 wherein the first bias current generator switch is a bipolar transistor.

9. The current transformer assembly according to claim 8 wherein the bipolar transistor includes, a base connected to the drive terminal, a collector connected to the voltage supply and an emitter connected to the second bias current generator switch.

10. The current transformer assembly according to claim 7 wherein the second current generator switch is a FET.

11. The current transformer assembly according to claim 10 wherein the FET includes a source connected to an emitter of a bipolar transistor of the first bias current generator switch, a gate connected to the first side of the secondary current transformer winding circuit, and a drain connected to a resistance which in turn is connected to the second side of the secondary current transformer winding circuit.

12. A current transformer assembly comprising:

a primary current transformer winding circuit for carrying primary current in a first and a second direction depending on composition of a received power pulse;

a secondary current transformer winding circuit magnetically linked to the primary current transformer winding circuit, configured to generate secondary current when the primary current in the first direction is flowing; and an active clamp magnetically linked to the primary current transformer winding circuit with polarity opposite that of the secondary current transformer winding circuit having a switch connected to a first side of a clamp winding, and a second side of the clamp winding connected to a diode, the active clamp configured to allow a clamp current to flow in the active clamp when the primary current flows in the second direction and the switch is turned on.

13. The current transformer assembly according to claim 12 further comprising:

a bias current generator inserted into the secondary current transformer winding circuit, including a first switch connected to a power supply, the first switch constructed to receive a drive pulse and to turn on upon receipt of the drive pulse, a second switch connected to the first switch, to a power supply which causes the second switch to be activated when the primary current is flowing in the second direction, and to the secondary current transformer winding circuit.

14. A current transformer assembly comprising:

a primary current transformer winding circuit for carrying a primary current in a first direction and a second direction, depending upon a composition of a received power pulse;

a secondary current transformer winding circuit magnetically linked to the primary current transformer winding circuit configured to generate secondary current when the primary current in the first direction is flowing; and a bias current generator inserted into the secondary current transformer winding circuit, including a first switch connected to a power supply, the first switch constructed to receive a drive pulse and to turn on upon receipt of the drive pulse, a second switch connected to the first switch, to a power supply which causes the second switch to be activated when the primary current is flowing in the second direction, and a resistance connected to the second switch to deliver a bias current to the secondary current transformer winding circuit when the primary current is flowing in the second direction.

15. The current transformer according to claim 14 further comprising:

an active clamp magnetically linked to the primary current transformer winding circuit with polarity opposite that of the secondary current transformer winding circuit having a switch connected to a first side of a clamp winding, and a second side of the clamp winding connected to a diode, the active clamp configured to allow a clamp current to flow in the active clamp when the primary current flows in the second direction and the switch is turned on.

16. The current transformer according to claim 14 wherein the second switch allows current to flow in accordance with an amount of voltage existing at the power supply.

* * * * *